United States Patent
Tung

(10) Patent No.: US 8,985,132 B2
(45) Date of Patent: Mar. 24, 2015

(54) BALANCE VALVE HAVING AN ASYMMETRIC STRUCTURE

(75) Inventor: Ping-Jung Tung, Taichung (TW)

(73) Assignees: Tung Ping-Jung, Taichung (TW); Paijo Co., Ltd., Changhua, Changhua County (TW)

( * ) Notice: Subject to any disclaimer, the term of this patent is extended or adjusted under 35 U.S.C. 154(b) by 785 days.

(21) Appl. No.: 13/269,804

(22) Filed: Oct. 10, 2011

(65) Prior Publication Data
US 2013/0087232 A1  Apr. 11, 2013

(51) Int. Cl.
*G05D 11/03* (2006.01)
*F16K 11/048* (2006.01)
*G05D 23/13* (2006.01)
*F16K 11/07* (2006.01)

(52) U.S. Cl.
CPC .......... *F16K 11/048* (2013.01); *G05D 23/1306* (2013.01); *G05D 23/1313* (2013.01); *G05D 11/03* (2013.01); *F16K 11/0716* (2013.01)
USPC ............................................ 137/98; 137/100

(58) Field of Classification Search
CPC ..... G05D 11/003; G05D 11/02; G05D 23/13; G05D 23/1306; G05D 23/1313
USPC .......................... 137/98, 100, 315.12, 315.13
See application file for complete search history.

(56) References Cited

U.S. PATENT DOCUMENTS

| | | | | |
|---|---|---|---|---|
| 5,839,471 A * | 11/1998 | Yang | ......................... | 137/625.18 |
| 6,267,134 B1 * | 7/2001 | Chen | ............................... | 137/98 |
| 6,302,135 B1 * | 10/2001 | Chung | ......................... | 137/100 |
| 6,412,513 B1 * | 7/2002 | Yang | ............................ | 137/100 |
| 7,028,702 B2 * | 4/2006 | Park et al. | ......................... | 137/98 |

* cited by examiner

*Primary Examiner* — Kevin Murphy
(74) *Attorney, Agent, or Firm* — Egbert Law Offices, PLLC

(57) ABSTRACT

A balance valve is provided with an asymmetric structure. When the dual-temperature ceramic valve is switched to cold water supply modes, and the hot water line is blocked to make a moveable spool abutted towards a first lateral end wall of a holding space, a cold water channel can thus be formed between the cold water opening of a fixed valve pipe and a second end of the moveable spool with the setting of the asymmetric structure. Hence, cold water supply can maintained. When the hot water line is blocked, the cold water supply function of the balance valve of the present invention could still be maintained for improved convenience and applicability.

4 Claims, 7 Drawing Sheets

BALANCE VALVE HAVING AN ASYMMETRIC STRUCTURE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a balance valve, and more particularly to an innovative one which is designed with an asymmetric structure to maintain cold water supply functions.

2. Description of Related Art Including Information Disclosed Under 37 CFR 1.97 and 37 CFR 1.98.

Given the fact that conventional dual-temperature ceramic valves may lead to transient burning and scalding due to manual error in turning the faucet and the difficulty in regulating water temperature due to unstable water pressure, an improved structure of a dual-temperature ceramic valve combined with a cold-hot water balance valve (balance valve) has thus been developed in this industry.

In spite of currently available ceramic products and relevant patents based on balance valves, some shortcomings and disadvantages still exist.

A conventional balance valve generally comprises a fixed valve pipe and moveable spool. Of which, a through-hole is set separately at both ends of the fixed valve pipe, and an opening arranged separately at its both sides so as to guide cold and hot water. An inner groove is formed separately at both ends of the moveable spool, and separated by a partition. Moreover, these two inner grooves are provided with an opening connected with that of the fixed valve pipe. With this structure, when cold and hot water separately pass through two inner grooves of the moveable spool via the openings at both sides of the fixed valve pipe, the moveable spool will yield reciprocating transverse movement with the variation of cold/hot water streams' flow velocity, based on the principle of higher velocity versus smaller pressure and smaller velocity versus bigger pressure as well as the property of water flow. This will change the sectional connection area between the moveable spool and the openings at both sides of the fixed valve pipe, serving the purpose of auto balancing of cold/hot water temperature.

The following shortcomings of typical balance valve are found during actual applications:

If conventional dual-temperature ceramic valve is combined with a balance valve, the functions of full cold/hot water supply modes are not affected even if the users manually turn the faucet handle to full cold water mode or full hot water mode.

If the dual-temperature ceramic valve is switched to cold/hot water supply modes and the hot-water line is blocked due to unpredictable elements (e.g.: cracking/blocking of line, and closing of control valve), the moveable spool of the balance valve is abutted onto the hot water side of the fixed valve pipe, such that the hot water flow channel is blocked and closed. In such a case, the moveable spool and the opening at cold water side of the fixed spool are fully staggered to block off the flow channel. That is to say, when the hot water line of typical balance valve is blocked, the cold water supply functions will be lost, exerting great impact on the functionality and convenience of faucet (note: since cold water mode is a most commonly used mode).

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

Based on the unique design of the present invention wherein the "balance valve" is provided with an asymmetric structure, when the dual-temperature ceramic valve is switched to cold/water supply modes, and hot water line is blocked to make the moveable spool abutted towards the first lateral end wall of the holding space, a cold water channel can thus be formed between the cold water opening of the fixed valve pipe and the second end of the moveable spool with the setting of said asymmetric structure. Hence, cold water supply could be maintained. Namely, when the hot water line is blocked, the cold water supply function of the balance valve could still be maintained for improved convenience and applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
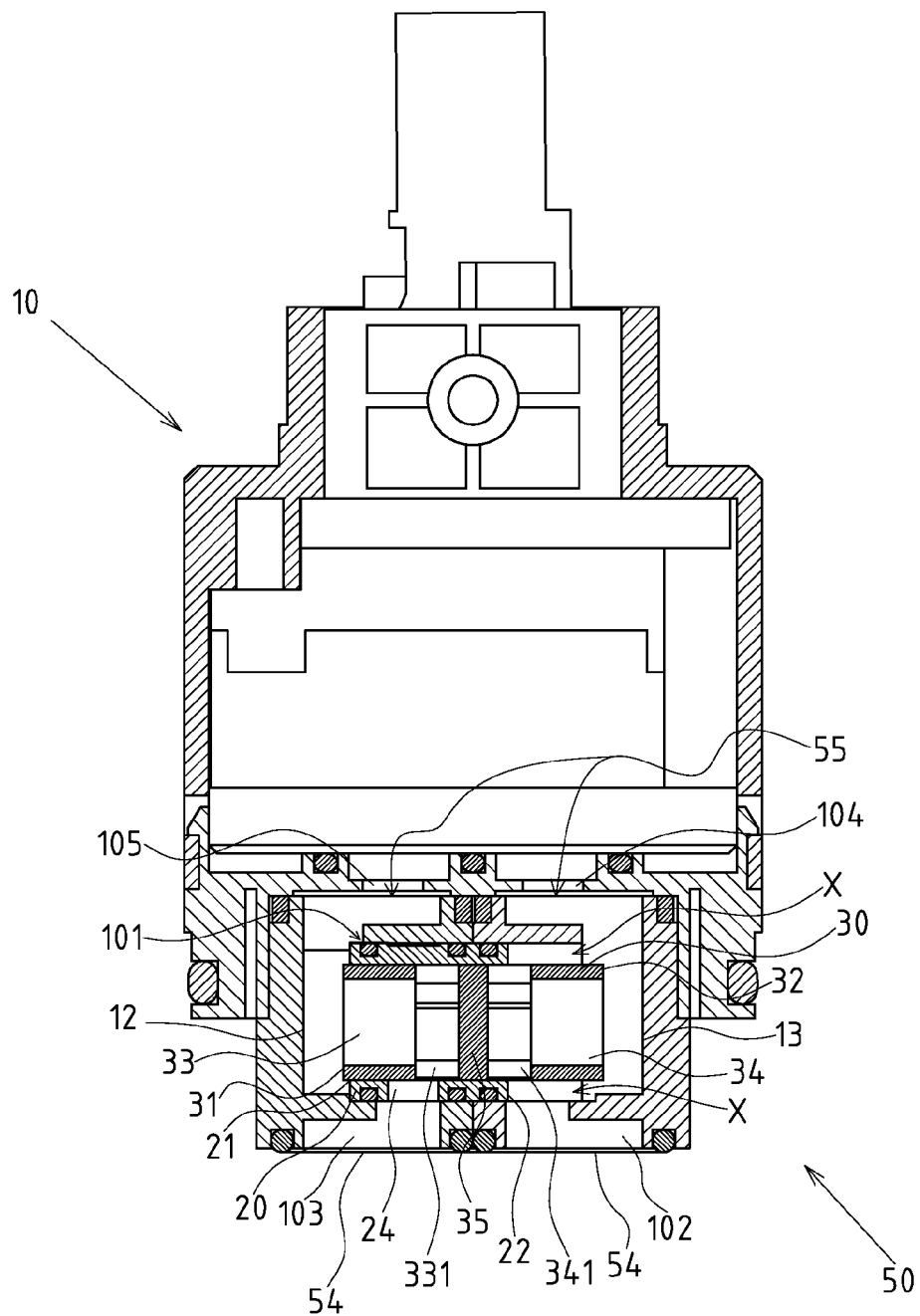
FIG. 1 is a sectional view of the balance valve assembly of the present invention.
Figure 2:
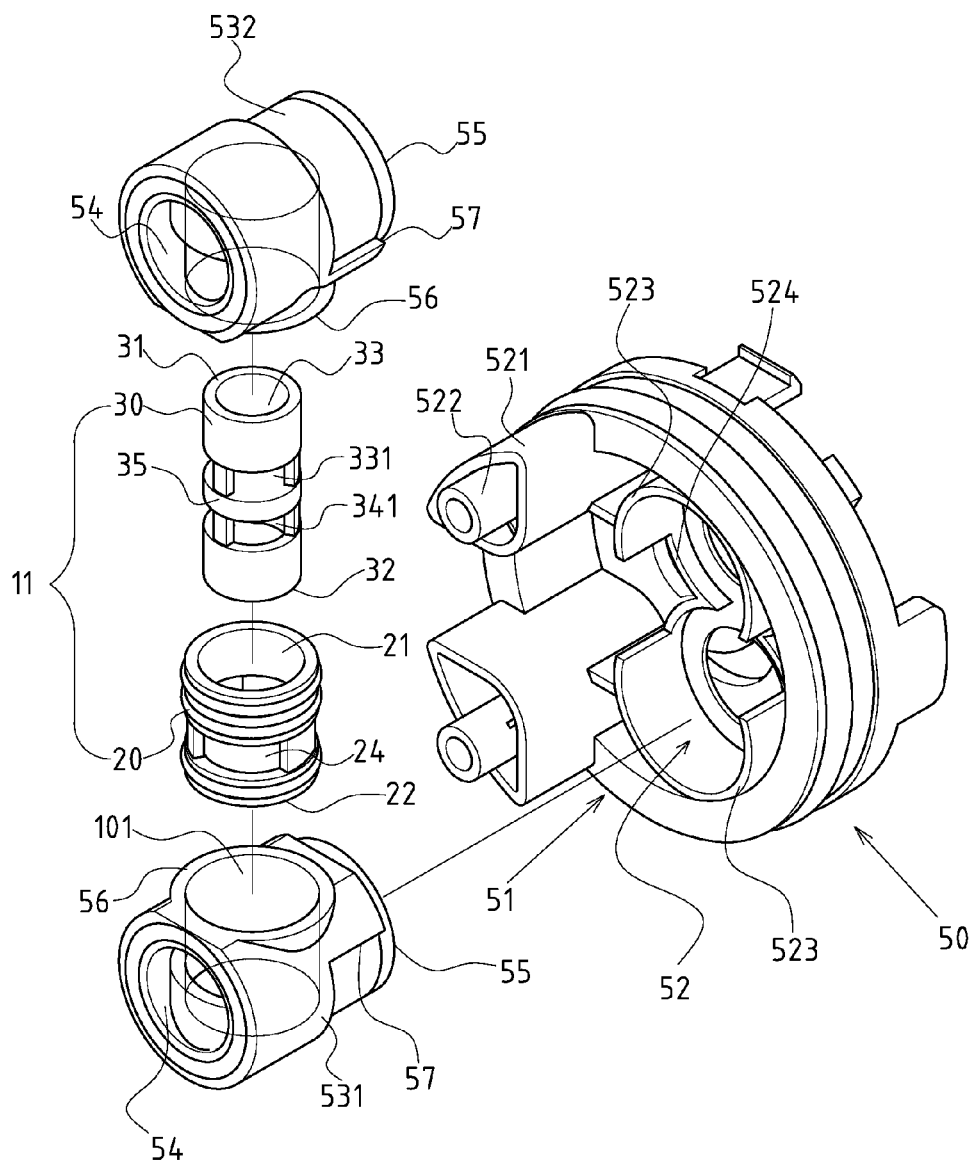
FIG. 2 is an exploded perspective view of the balance valve assembly of the present invention.
Figure 3:
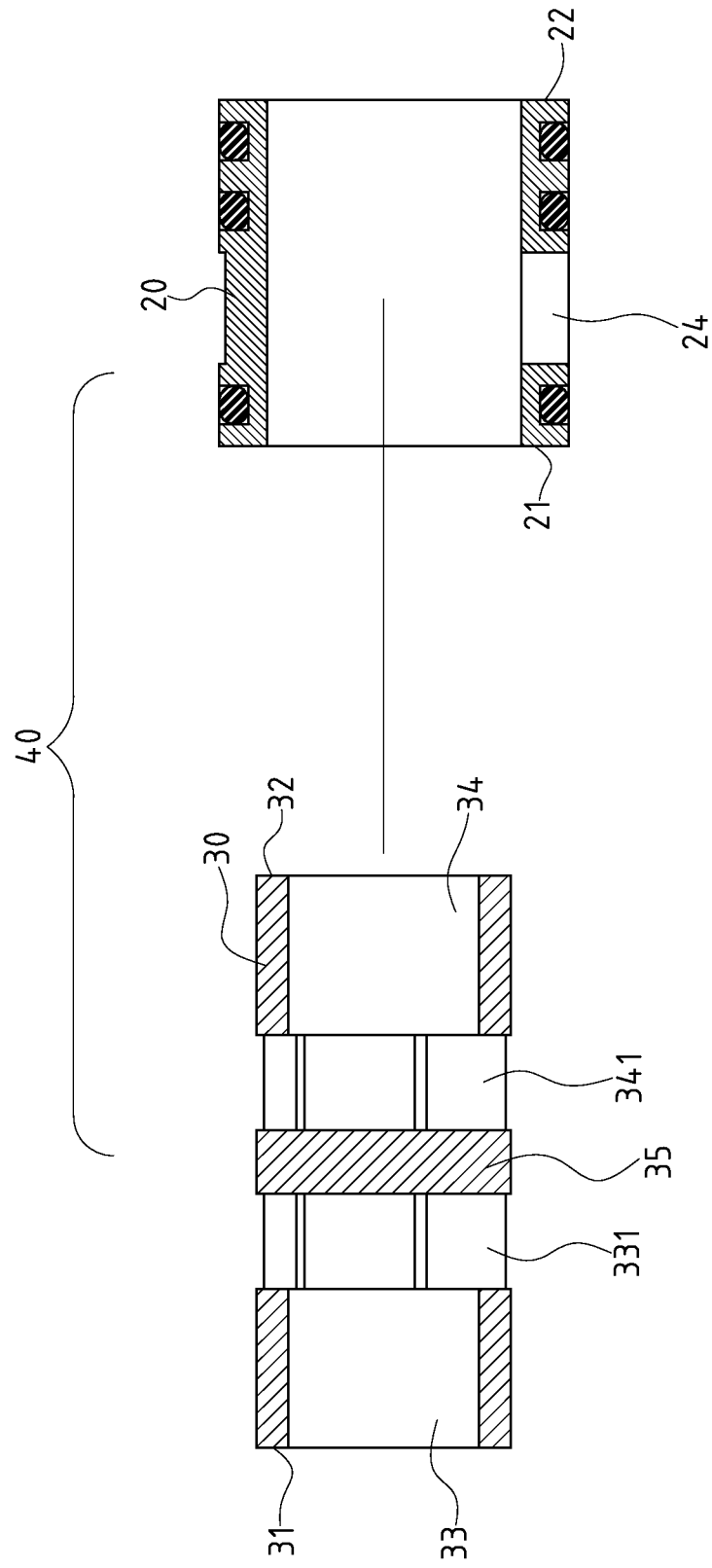
FIG. 3 is a sectional view of the balance valve's asymmetric structure of the present invention.

FIGS. 1-3 depict preferred embodiments of an asymmetric balance valve of the present invention, which, however, are provided for only explanatory objective for patent claims. Said balance valve 11 is accommodated in a holding space 101 preset into the dual-temperature ceramic valve 10. The holding space 101 has a cold water inlet 102 and a hot water inlet 103 arranged at interval on the bottom, a cold water outlet 104 and a hot water outlet 105 arranged at interval on the top, as well as a first lateral end wall 12 and a second lateral end wall 13 located at both ends.

The balance valve 11 includes a fixed valve pipe 20 (in collaboration with FIGS. 1 and 5), a transverse hollow pipe, having a first end 21 correspondingly to the first lateral end wall 12, a second end 22 correspondingly to the second lateral end wall 13, a cold water opening 23 connected with the cold water inlet 102, and a hot water opening 24 connected with the hot water inlet 103. Moreover, the first end 21 is connected with the hot water outlet 105, and the second end 22 connected with the cold water outlet 104.

A moveable spool 30 is transversely assembled into the fixed valve pipe 20 in a transverse movement state. The moveable spool 30 is provided with a first end 31 and a second end 32, of which the first end 31 is recessed to form a hot water slot 33, and the second end 32 is recessed to form a cold water slot 34. The hot water slot 33 and cold water slot 34 are separated by a partition 35. The hot water slot 33 is provided with a hot water punch hole 331 connected with the hot water opening 24 of the fixed valve pipe 20, and the cold water slot 34 is provided with a cold water punch hole 341 connected with the cold water opening 23 of the fixed valve pipe 20.

An asymmetric structure 40 (referring to FIG. 3) is extended asymmetrically by the first ends 21, 31 and second ends 22, 32 of the fixed valve pipe 20 or the moveable spool 30. Or, it is expanded asymmetrically by the hot water opening 24 and cold water opening 23 of the fixed valve pipe 20, or expanded asymmetrically by the hot water punch hole 331 and cold water punch hole 341 of the moveable spool 30.

Of which, the bottom of the dual-temperature ceramic valve includes a long-legged pedestal 50, at bottom 51 of which an inlet pipe groove 52 is set for assembly and positioning of an inlet pipe assembly 53. The inlet pipe assembly 53 has a cold water pipe 531 and a hot water pipe 532. Two protruding footstands 521 are set laterally at the bottom 51 of the long-legged pedestal 50. An embedded column 522 is set at bottom of two protruding footstands 521. The cold/hot water pipes 531, 532 have a lower nozzle 54, which is mated closely with the upper nozzle 55 of the inlet pipe groove 52 and the open abutting side 56, of which the abutting sides 56 of the cold/hot water pipes 531, 532 are assembled to form a holding space 101 for the balance valve 11.

Of which, the inlet pipe groove 52 is shaped by a convex ringed frame 523, and an embedded groove 524 is partially set on the convex ringed frame 523, such that an embedded flange 57 is set laterally on upper nozzle 55 of the cold/hot water pipes 531, 532 of the inlet pipe assembly 53.

Based on above-specified structure of said asymmetric structure 40, if the dual-temperature ceramic valve 10 is switched to cold/hot water supply modes, the hot-water line is blocked, making the moveable spool 30 abutted onto the first lateral end wall 12 of the holding space 101. With the setting of said asymmetric structure 40, a cold water channel X is formed between the cold water opening 23 of the fixed valve pipe 20 and the second end 32 of the moveable spool 30 to maintain cold water supply function.

Figure 4:
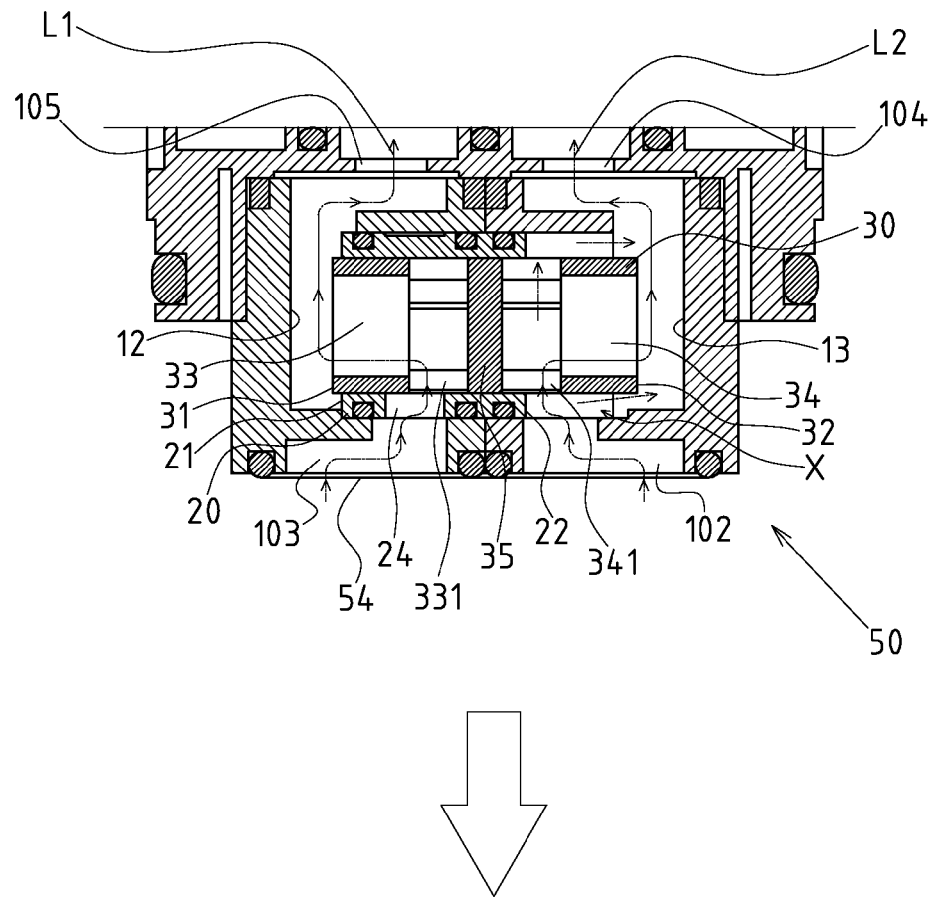
FIG. 4 is a contrast diagram showing the section and operating status of the first preferred embodiment of the balance valve's asymmetric structure of the present invention.
Figure 4:
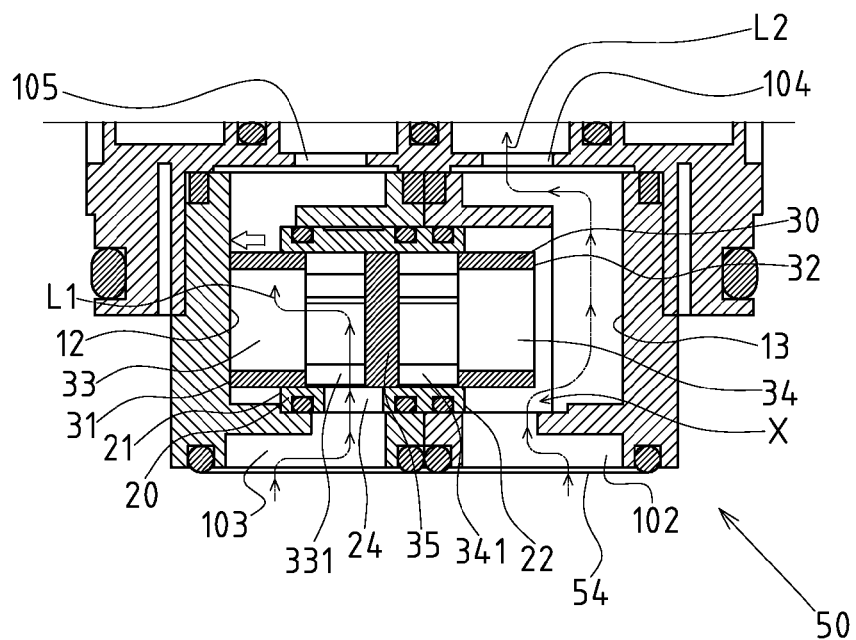

The preferred embodiments of the asymmetric structure of the present invention are described below:

Referring to FIG. 4, when cold/hot water lines L1, L2 are used for water supply simultaneously, the moveable spool 30 of the balance valve 11 is under a balanced state in the fixed valve pipe 20. The operating status of the first preferred embodiment of the asymmetric structure 40 of the balance valve 11 is illustrated in FIG. 4. When the hot water line L1 is blocked, the cold water line L2 continuously pushes the partition 35 of the moveable spool 30, so that the moveable spool 30 is abutted towards the first lateral end wall 12 of the holding space 101. In such a case, the second end 32 of the moveable spool 30 is extended beyond the second end 22 of the fixed valve pipe 20 to form a sectional difference; and, the second end 22 of the fixed valve pipe 20 is relatively shorter to keep spacing with the cold water inlet 102, such that a cold water channel X is formed within the holding space 101 between the moveable spool 30 and fixed valve pipe 20, thus maintaining continuous cold water supply state.

Figure 5:
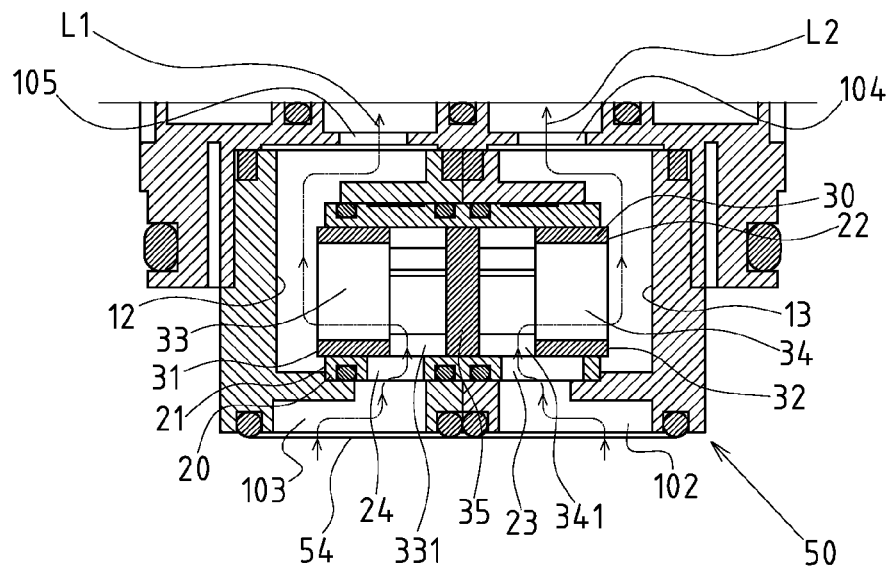
FIG. 5 is a contrast diagram showing the section and operating status of the second preferred embodiment of the balance valve's asymmetric structure of the present invention.
Figure 5:
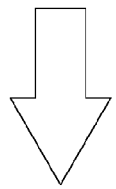
Figure 5:
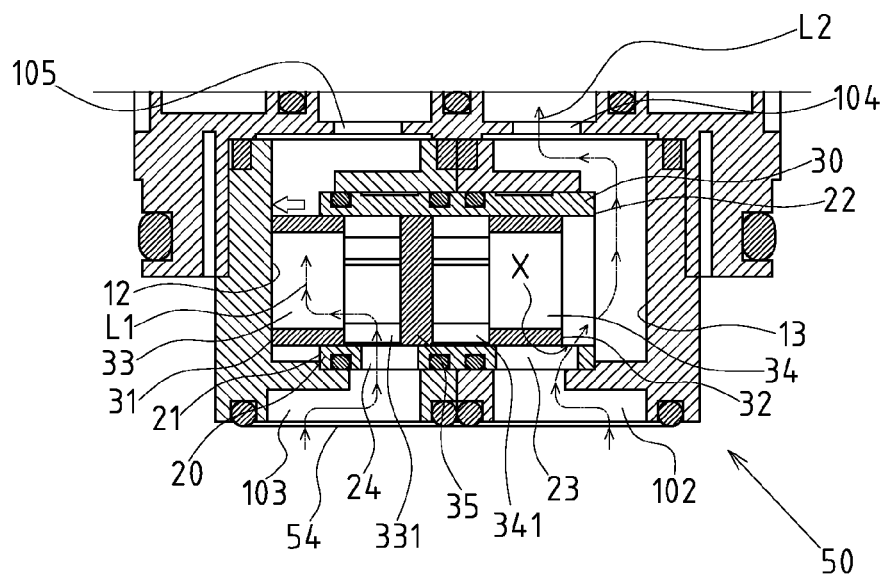

The second preferred embodiment of the asymmetric structure 40 of the balance valve 11 is illustrated in FIG. 5, wherein the cold water opening 23 of the fixed valve pipe 20 is wider than the hot water opening 24 to form an asymmetric pattern. When hot water line L1 is blocked, and the moveable spool 30 is abutted towards the first lateral end wall 12 of the holding space 101, said cold water channel X is formed to maintain water supply state of cold water line L2 since the cold water opening 23 of the fixed valve pipe 20 is wider than the second end 32 of the moveable spool 30.

Figure 6:
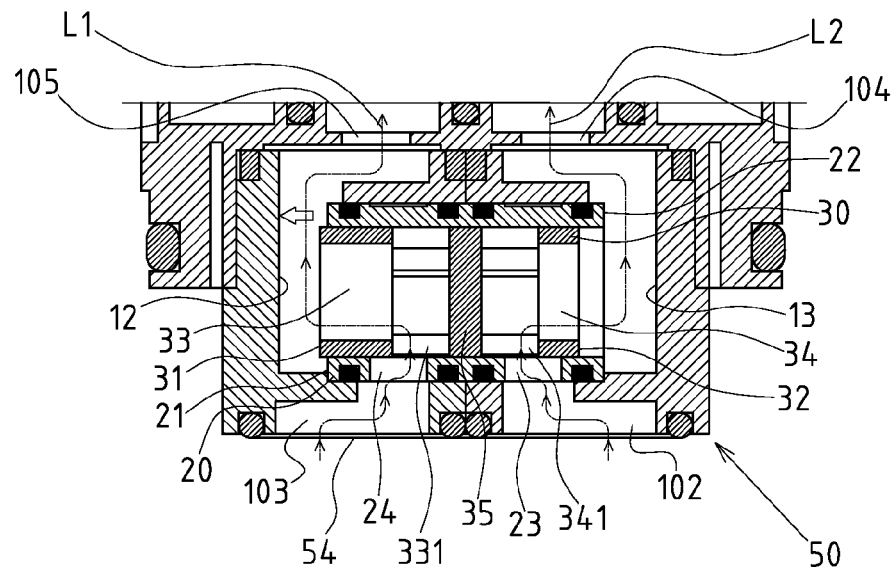
FIG. 6 is a contrast diagram showing the section and operating status of the third preferred embodiment of the balance valve's asymmetric structure of the present invention.
Figure 6:
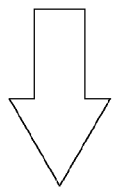
Figure 6:
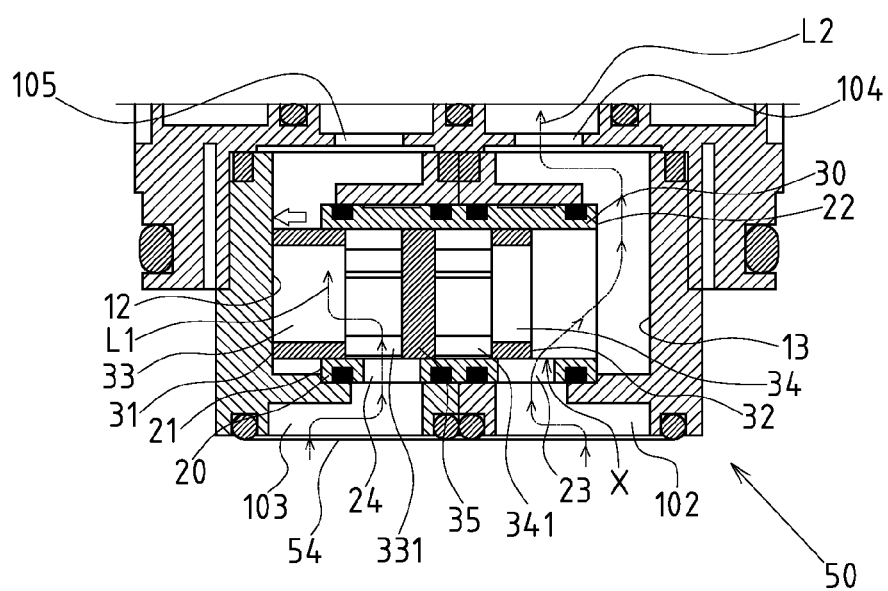

The third preferred embodiment of the asymmetric structure 40 of the balance valve 11 is illustrated in FIG. 6. When hot water line L1 is blocked, the moveable spool 30 is abutted towards the first lateral end wall 12 of the holding space 101. In such a case, said cold water channel X is formed to maintain water supply state of cold water line L2 since the shorter second end 22 of the moveable spool 30 cannot block off the cold water opening 23 of the fixed valve pipe 20.

Figure 7:
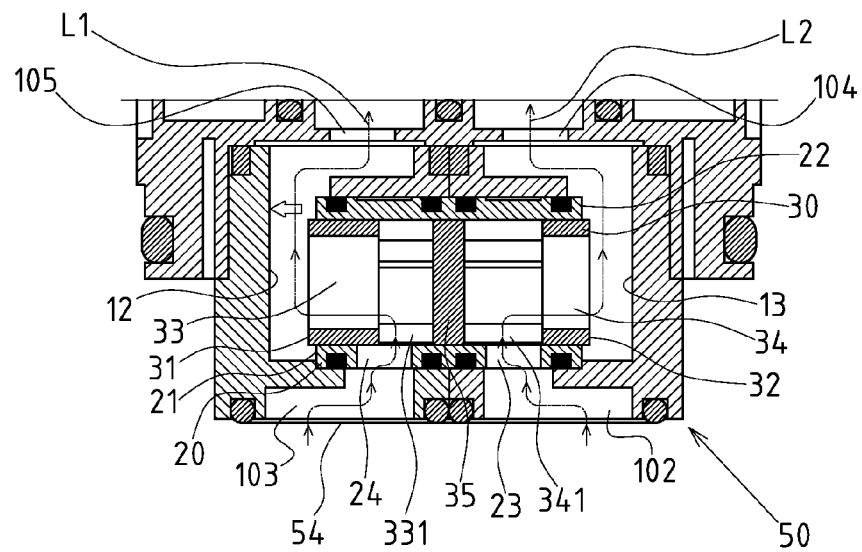
FIG. 7 is a contrast diagram showing the section and operating status of the fourth preferred embodiment of the balance valve's asymmetric structure of the present invention.
Figure 7:
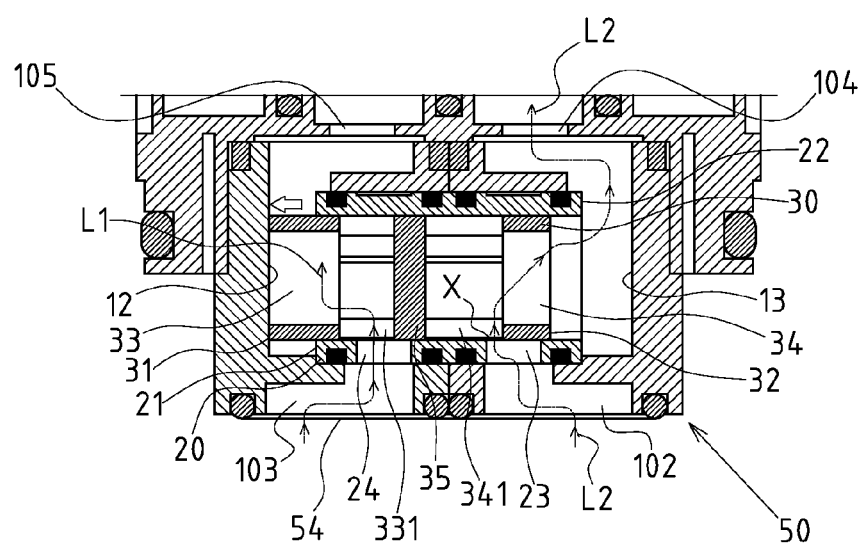

The fourth preferred embodiment of the asymmetric structure 40 of the balance valve 11 is illustrated in FIG. 7, wherein the cold water punch hole 341 of the moveable spool 30 is wider than the hot water punch hole 331 to form an asymmetric pattern. When hot water line L1 is blocked, the moveable spool 30 is abutted towards the first lateral end wall 12 of the holding space 101, said cold water channel X is formed to maintain water supply state of cold water line L2 due to sectional difference between the cold water punch hole 341 of the moveable spool 30 and the cold water opening 23 of the fixed valve pipe 20.

I claim:

1. A valve apparatus comprising:
   a dual-temperature ceramic valve having a holding space, said holding space having a cold water inlet and a hot water inlet arranged in spaced relationship to each other at a bottom of said holding space, said holding space having a cold water outlet and a hot water outlet in spaced relationship to each other at a top of said holding space, said holding space having a first lateral wall and a second lateral wall at opposite ends thereof;
   a fixed valve pipe having a transverse hollow pipe with a first end corresponding to said first lateral wall and a second end corresponding to said second lateral wall, said fixed valve pipe having a cold water opening connected to said cold water inlet and a hot water opening connected to said hot water inlet, said first end connected to said hot water outlet, said second end connected to said cold water outlet;

a movable spool transversely assembled into said fixed valve pipe and transversely movable therein, said movable spool having a first end and a second end, said first end of said movable spool being recessed so as to form a hot water slot, said second end of said movable spool being recessed to form a cold water slot, said hot water slot being separated by a partition from said cold water slot, said hot water slot having a hot water punch hole connected to said hot water opening of said fixed valve pipe, said cold water slot having a cold water punch hole connected with said cold water opening of said fixed valve pipe; and an asymmetric structure extended asymmetrically by said first end and said second end or by said first end and said second end of said movable spool or by said hot water opening and said cold water opening of said fixed valve pipe or by said hot water punch hole and said cold water punch hole of said movable spool, said ceramic valve being switchable to a cold water supply mode so as to block a hot water supply line in order to make said movable spool abut said first lateral wall of said holding space so as to form a cold water channel between said cold water opening of said fixed valve pipe and said second end of said movable spool.

2. The valve apparatus of claim 1, said ceramic valve having a pedestal, said pedestal having an inlet pipe groove at a bottom thereof, said ceramic valve having an inlet pipe assembly received in said inlet pipe groove, said inlet pipe assembly having a hot water pipe and a cold water pipe, said pedestal having a pair of protruding footstands set laterally at said bottom thereof, each of said pair of protruding footstands having an embedded column at a bottom thereof, each of said cold water pipe and said hot water pipe having a lower nozzle mated closely with an upper nozzle of said inlet pipe groove, each of said cold water pipe and said hot water pipe having an abutting side that is assembled to form a portion of said holding space.

3. The valve apparatus of claim 2, said inlet pipe groove being shaped by a convex ringed frame, said convex ringed frame having an embedded groove partially set thereon.

4. The valve apparatus of claim 1, said asymmetric structure being formed by extending asymmetrically said first end and said second end of said fixed valve pipe, said second end of said fixed valve pipe being shorter than said first end of said fixed valve pipe, said second end of said movable spool extending beyond said second end of said fixed valve pipe when said movable spool is abutted toward said first lateral wall of said holding space, said second end of said fixed valve pipe being spaced from said cold water inlet when said movable spool abuts said first lateral wall of said holding space, a cold water channel being formed within said holding space between said movable spool and said fixed valve pipe when said movable spool abuts said first lateral wall of said holding space.

* * * * *